United States Patent Office.

HENRY WURTZ, OF NEW YORK, N. Y.

*Letters Patent No. 73,862, dated January 28, 1868.*

IMPROVED PREPARATION FROM GRAHAMITE CALLED VISCOSINE.

*The Schedule referred to in these Letters Patent and making part of the same.*

TO ALL WHOM IT MAY CONCERN:

Be it known that I, HENRY WURTZ, of New York, in the county of New York, in the State of New York, have invented a new and improved Article of Manufacture or Chemical Preparation, obtained from the mineral of Ritchie county, West Virginia, called by me Grahamite; and I do hereby declare that the following is a full and exact description thereof, reference being had to the accompanying samples of the preparation.

Description.

The nature of my invention consists in operating upon pulverized Grahamite with certain liquid media or menstrua, which I have found to exert thereon a specific and partial solvent action, and to extract therefrom a valuable, new, and peculiar resinous or resinoid product, which, when isolated by evaporation of the solvent, presents the aspect of a mass of great brilliancy or lustre, extremely adhesive and ductile when warm, and usually of a faint and peculiar aromatic or balsamic odor, recalling that of liquorice-root, to which I have given the name of Alpha Grahamite Resinoid, or Viscosine.

The solvents which may be used for separating the alpha resin from Grahamite are many in number, including most liquids of the classes of ethers and naphthas; the most available in practice, however, being common sulphuric ether, and the more volatile products of the distillation of petroleum, (known in commerce under the names of benzine, petroleum-naphtha, gasoline, &c.)

The alpha resinoid of Grahamite has been found especially well adapted for making certain kinds of cements and varnishes, and for other purposes to be described in specifications of other patents now in preparation for filing.

Claim.

What I claim as my invention, and desire to secure by Letters Patent, is—

The new chemical preparation or article of manufacture, specified and described above, called by me alpha resinoid of Grahamite, or viscosine, and obtained by the action of solvents upon the mineral Grahamite, substantially as set forth.

In testimony whereof, I have hereunto attached my signature, in Washington, this thirty-first day of July, 1867.

HENRY WURTZ.

Witnesses:
JOHN F. CLARK,
C. A. SEARS.